Patented Sept. 26, 1933

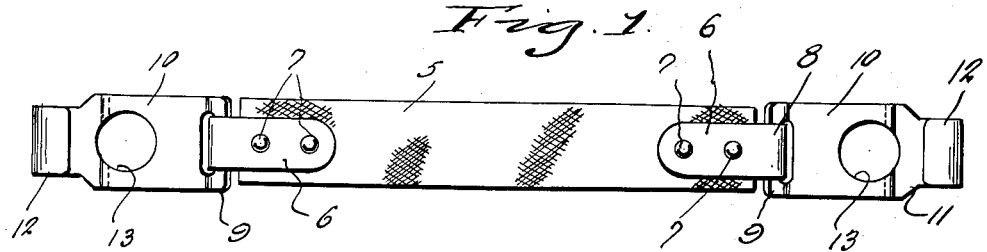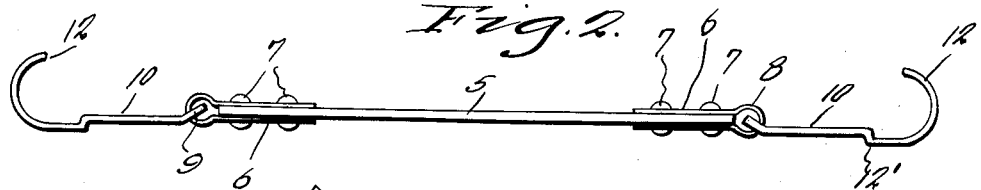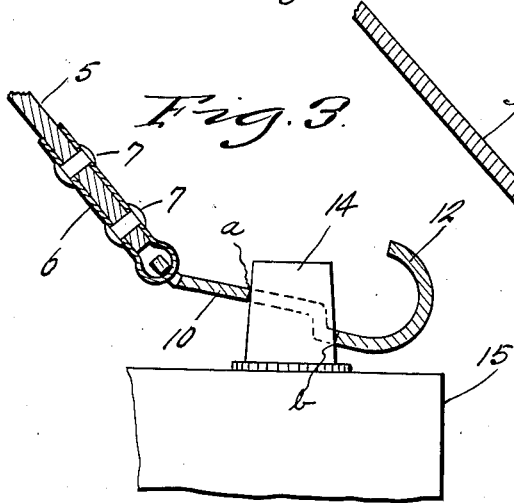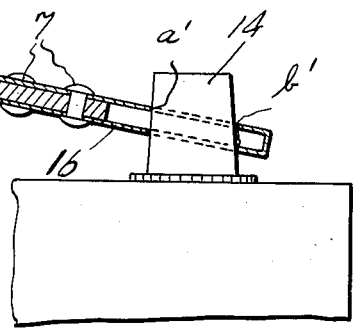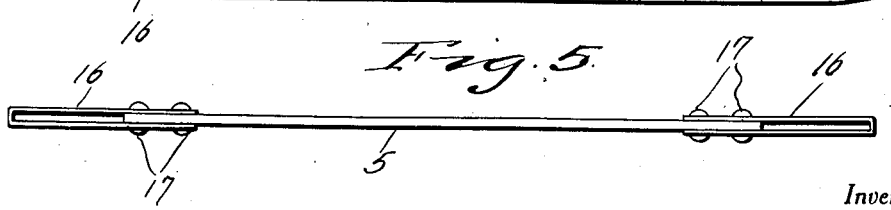

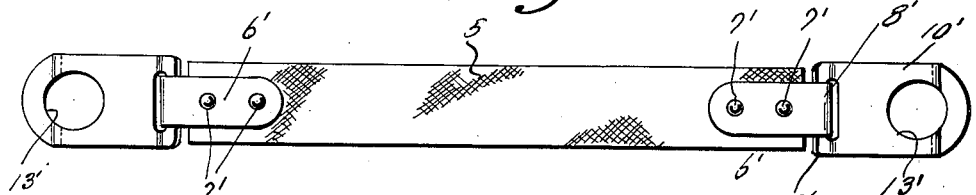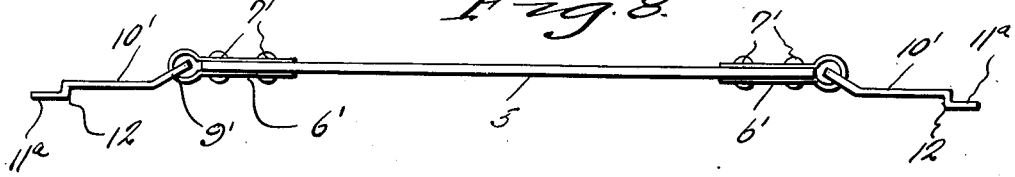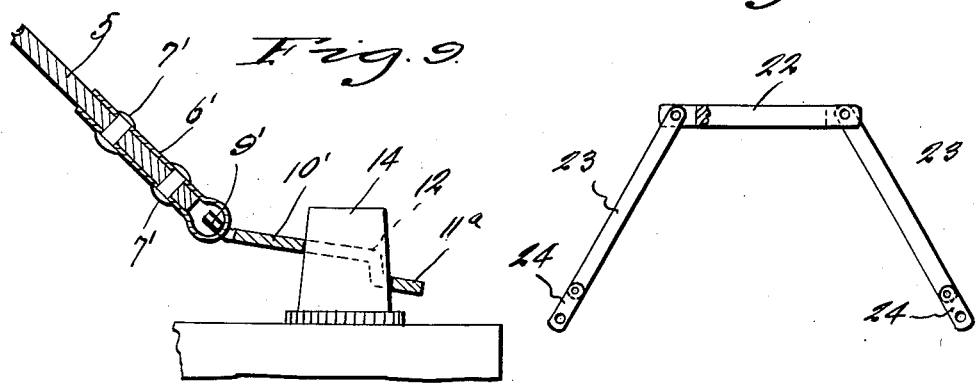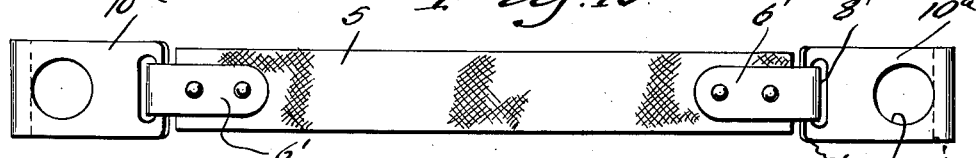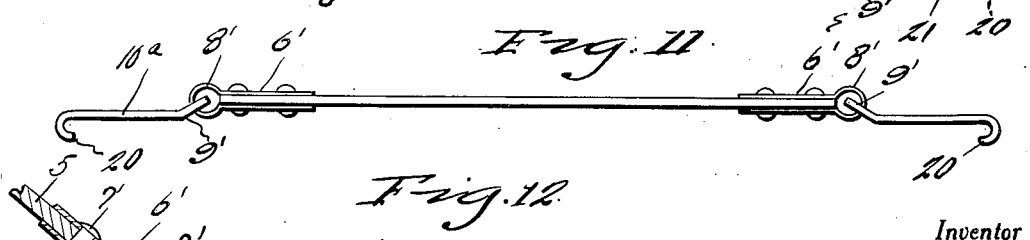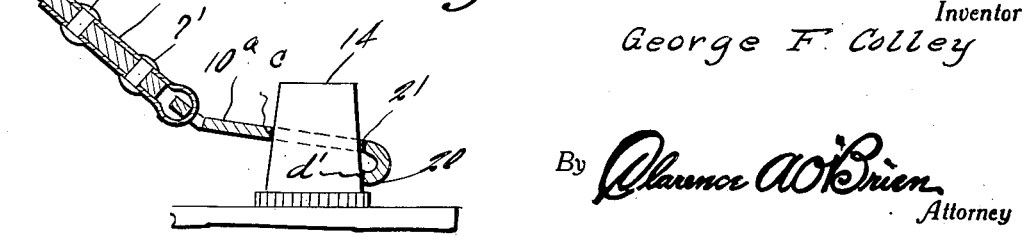

1,927,920

UNITED STATES PATENT OFFICE 1,927,920

BATTERY CARRIER

George F. Colley, Louisville, Ky., assignor of one-third to William B. Carlisle and one-third to Tony J. Landenwich, Louisville, Ky.

Application May 31, 1932. Serial No. 614,590

3 Claims. (Cl. 294—92)

This invention appertains to new and useful improvements in article handling and hoisting implements and more particularly to a novel carrier for storage batteries.

The principal object of this invention is to provide a novel carrier in the form of a handle which can be quickly applied and removed with respect to a battery.

Another important object of the invention is to provide a battery carrier which can be used in application with the usual posts on the battery, or with the usual handles on a battery on instances where the battery is provided with handles.

Other important objects and advantages of the invention will become apparent to the reader of the following specification.

In the drawings:—

Figure 1 is a top plan view of one form of the invention.

Fig. 2 is an edge elevation of the battery carrier shown in Fig. 1.

Fig. 3 represents an enlarged fragmentary detailed sectional view showing one of the grippers of the form shown in Fig. 1 engaged with a battery post.

Fig. 4 represents a top plan view of a modified form of the invention.

Fig. 5 represents an edge elevational view of the form shown in Fig. 4.

Fig. 6 represents a fragmentary detailed sectional view of one of the grippers of the form shown in Fig. 4 engaged with a battery post.

Fig. 7 represents a top plan view of a third form of the invention.

Fig. 8 represents an edge elevational view of the form shown in Fig. 7.

Fig. 9 represents a fragmentary detailed sectional view showing one of the grippers of the form shown in Fig. 7 engaged with the post of a battery.

Fig. 10 represents a top plan view of a fourth form of the invention.

Fig. 11 represents an edge elevational view of the form shown in Fig. 10.

Fig. 12 represents a fragmentary detailed sectional view showing one of the grippers of the form shown in Fig. 10 engaged with a battery post.

Fig. 13 represents a side elevational view of a fifth form of the invention.

Referring to the drawings wherein like numerals designate like parts, it can be seen in Fig. 1, that numeral 5 represents a handle section, of leather, metal, wood, or in fact any other suitable material. At each end of the member 5 is a metallic strap 6 which has its end portion engaged against opposite sides of the member 5 and riveted to the member as at 7, thus forming a loop 8 loosely disposed through the obliquely disposed end portion 9 of the gripper plate or attaching element 10, there being one of these plates at each end of the member 5.

Each of the plates 10 adjacent its outer end is provided with a downwardly disposed offset portion 11, and an upwardly curved extension forming a hook 12. The offset portion defines a shoulder 12' and a circular battery post opening 13 cut through this shoulder 12' and a portion of the extension 11 to the extent shown in Fig. 3. The offset portion or shoulder 11 affords means permitting a good gripping action on the battery posts 14.

It is important to observe that the outer portion of each attaching element 10 is curved upon itself first, to present a rounded contact surface for possible engagement with the battery and thereby prevent destructive contact of the attaching element with the battery, second, to define a bill for engagement with the handle of the battery, provided, of course, the battery has handles, and third, to provide finger pieces by which the attaching elements may be conveniently attached to the posts of a battery.

In Fig. 3, numeral 14 represents the battery post of a battery 15 and in applying the implement the grippers are disposed downwardly over the post 14 with the post projecting upwardly through the opening 13 of the gripper plates 10. When the member 5 is pulled upwardly, the plates 10 are tilted and assume the position shown in Fig. 3, biting the post at the points a and b.

If desired, where slotted handles are provided on the battery, the hooks 12 can be disposed therethrough, whereby the battery can be carried without engaging the plates 10 with the post 14.

Another form of the invention is shown in Figs. 4, 5, 6 wherein the handle member 5 is provided at each end with a gripper consisting of a U-shaped plate 16 having its end portions riveted to the handle 5 as at 17. The upper and lower leg portions of the plate 16 are formed with registering openings 18 and in use, when the handle member 5 is pulled upwardly, the gripper plates 16 are tilted to the position shown in Fig. 6 whereby the gripper plates engage the post 14 at the points a' and b'.

The third form of the invention shown in Fig. 7 consists of the handle member 5 and the aforementioned strap 6' secured as before described to the member 5 by rivets 7'. The loop 8' is disposed thru the obliquely disposed end portion 9' of a gripper plate 10' located at each end of the handle 5 and in comparing Figs. 8 and 2, it will be seen that the gripper plate 10' is a reproduction of the gripper plate 10, excepting for the hook 12, there being provided on the gripper plate 10' the shoulder 12, and short extension 11a, with a post receiving opening 13' cutting through the shoulder 12. The gripper plate 10' engages the post 14 in the same manner as does the gripper plate 10 in Fig. 3.

Fig. 10 discloses a fourth form of the invention which involves the handle 5 and the aforementioned straps 6' defining loops 8' which are disposed through the obliquely disposed end portions 9' of gripper plates 10a. Each of these gripper plates 10a has a downwardly and backwardly curved extension 20. The gripper plate 10a is provided with a circular opening 21 for receiving the battery post 14 in the manner shown in Fig. 12.

In this form, the gripper plate 10a bites the post at the points c and d' as clearly shown in Fig. 12.

The form shown in Fig. 13 discloses a somewhat rigid handle 22 and a link member 23 pivotally connected to each end thereof. These link members 23 are provided at their free ends with auxiliary links 24 of short extent which engage with suitable gripper plates 10, 16, 10' or 10a.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. A carrier of the character described comprising a handle, a swingable gripper at each end thereof, each of said grippers being provided with an offset portion defining a shoulder, and an article receiving opening in each gripper cutting through the said shoulder.

2. In a carrier for batteries of the type having posts; a pair of attaching elements; and a handle connected to the attaching elements, each attaching element being formed with longitudinally inner and outer offset sections and an intervening shoulder, there being a post receiving opening passing through each shoulder and the contiguous portions of the offset sections.

3. In a carrier for batteries of the type having posts; a pair of attaching elements; and a handle connected to the attaching elements, each attaching element being formed with longitudinally inner and outer offset sections and an intervening angularly disposed shoulder, there being a post receiving opening passing through each shoulder between the ends thereof and the contiguous portions of the offset sections, the outer section of each attaching element being curved upon itself to provide a rounded contact surface for possible engagement with the battery and to define a finger piece for manual engagement, facilitating application and removal of the attaching elements.

GEORGE F. COLLEY.